United States Patent [19]
Greenwell et al.

[11] Patent Number: 5,337,887
[45] Date of Patent: Aug. 16, 1994

[54] QUICK-DISCONNECT LUG FOR A CARTONING MACHINE

[75] Inventors: Joseph D. Greenwell; Robert M. Kalany, both of Florence; John M. Paselsky, Ft. Mitchell, all of Ky.

[73] Assignee: R. A. Jones & Co. Inc., Covington, Ky.

[21] Appl. No.: 20,200

[22] Filed: Feb. 19, 1993

[51] Int. Cl.⁵ .............................................. B65G 29/00
[52] U.S. Cl. .................. 198/803; 198/803.13; 198/473.1
[58] Field of Search ................ 198/731, 473.1, 484.1, 198/803.01, 803.2, 803.11, 803.13, 803.14

[56] References Cited

U.S. PATENT DOCUMENTS

| | | | |
|---|---|---|---|
| 2,546,262 | 3/1951 | Hatcher | 198/731 |
| 3,333,514 | 8/1967 | Jones . | |
| 3,476,024 | 11/1969 | Deering et al. . | |
| 4,187,773 | 2/1980 | Sampson | 198/803.01 |
| 4,281,675 | 8/1981 | Pure | 198/803.11 X |
| 4,582,193 | 4/1986 | Larsson | 198/803.01 |
| 4,660,353 | 4/1987 | Greenwell . | |
| 4,893,707 | 1/1990 | Langen et al. | 198/803.11 X |
| 5,004,097 | 4/1991 | Roinestad et al. | 198/803.01 |

FOREIGN PATENT DOCUMENTS 0644642 7/1964 Belgium .............................. 198/731

*Primary Examiner*—James R. Bidwell
*Attorney, Agent, or Firm*—Wood, Herron & Evans

[57] ABSTRACT

A quick-disconnect lug for transporting cartons along the conveyor of a cartoning machine. The lug includes a base member for attachment to studs extending from the endless chain of the conveyor. The base member preferably has a pair of slots or recesses extending upwardly from its bottom edge for receiving the studs. A latch member is pivotally attached to the base member and includes a hooked end that acts to firmly engage one of the studs in a slot to lock the lug onto the conveyor chain. A spring member on the latch arm keeps the hooked end in a normally closed position to retain the hooked stud in a locked position. The pivot point of the latch member is positioned between the lever end and the hooked end of the spring member. The lever end may be moved downwardly to pivot the hooked end of the spring member out of the recess to allow a stud to be engaged or disengaged from the recess during machine set-up or changeover. Lugs are reset quickly and without tools. The quick disconnect apparatus can be used to secure various devices onto chains with extending studs.

14 Claims, 3 Drawing Sheets

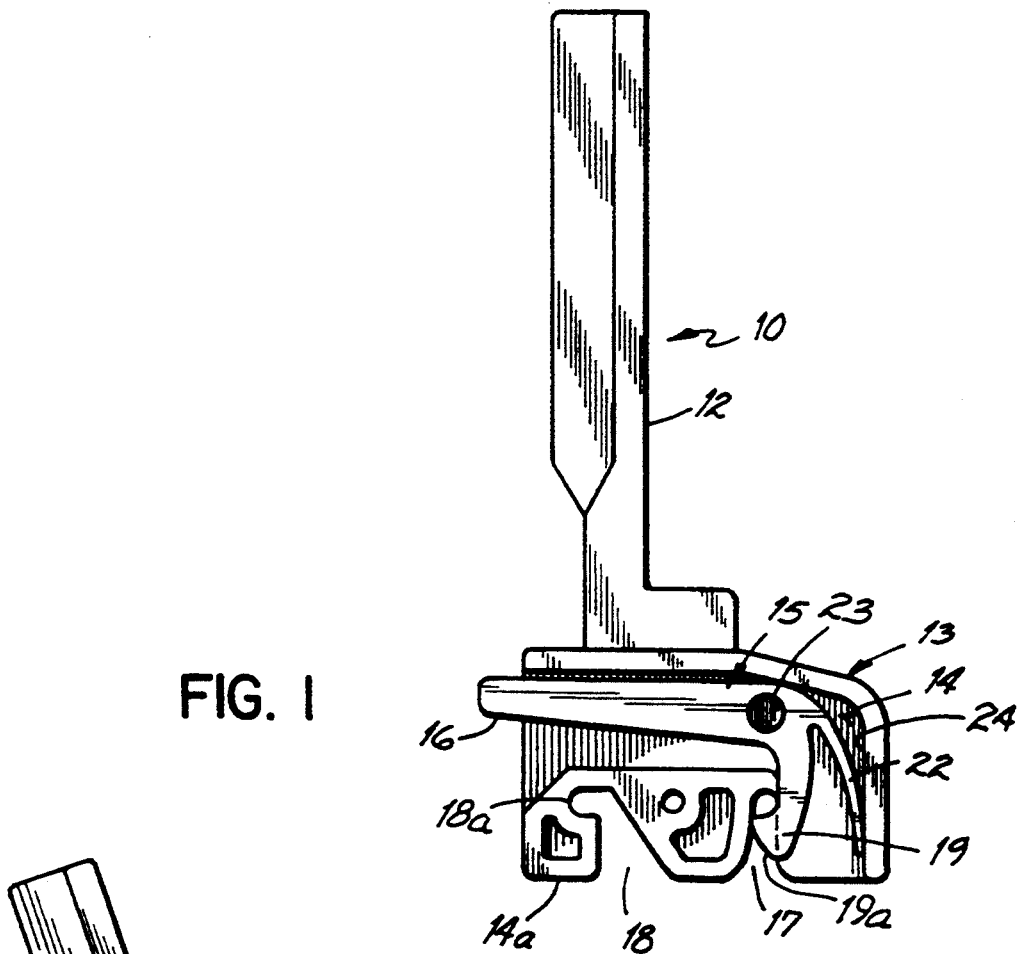
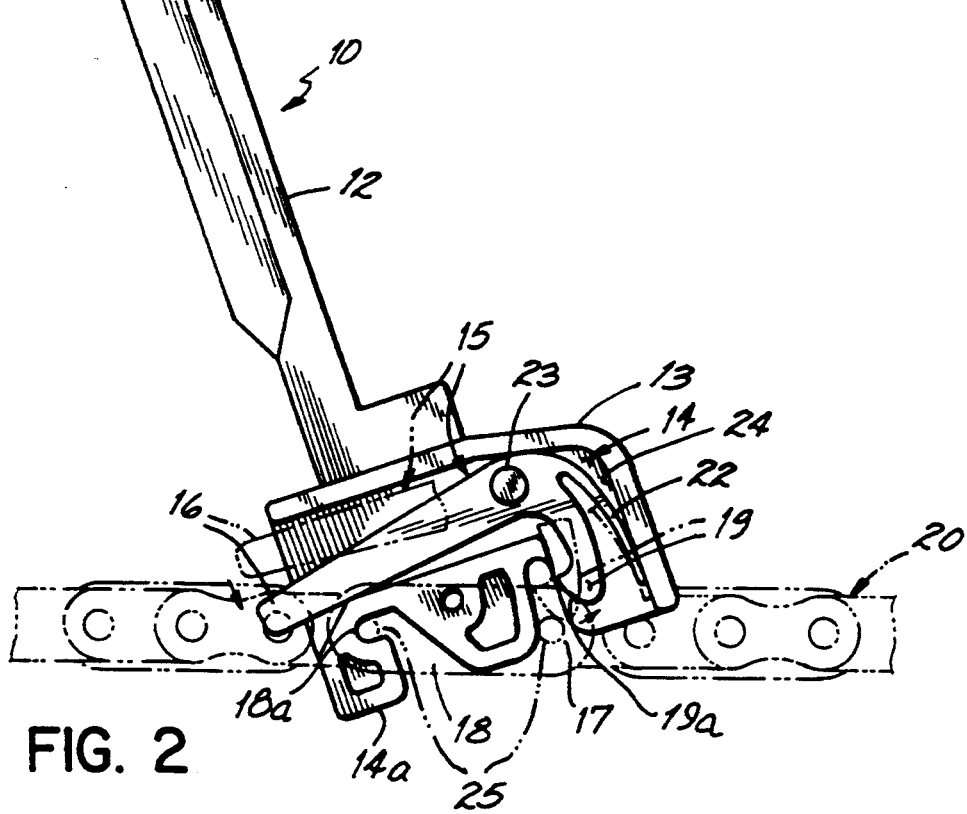

QUICK-DISCONNECT LUG FOR A CARTONING MACHINE

BACKGROUND OF THE INVENTION

This invention generally relates to an apparatus for securing attachments to chains and more specifically to apparatus for securing lugs used in cartoning machines to conveyor chains to position and carry cartons travelling through the cartoning machine.

Cartoning machines to which the present invention is applied have been used in the packaging industry for many years. Typically, these cartoning machines feed flat folded carton blanks from a magazine, one at a time, onto a conveyor which carries them to a fill station. The carton blank includes upper and lower major walls interconnected by leading and trailing side walls and are erected, as they are fed and conveyed, into a tubular rectangular form with the axis of the tube oriented transversely to the machine direction, When the carton is erected, it is typically captured between a leading transport lug mounted on an endless conveyor chain and a trailing transport lug mounted on another endless conveyor chain. The two endless conveyor chains carry the lugs and erected carton downstream for further processing, i.e., filling, closing and sealing the cartons.

Examples of such cartoning machines are shown in U.S. Pat. No. 3,333,514 to Jones and entitled PROGRESSIVE CARTON HANDLING MECHANISM FOR CARTONING MACHINES and U.S. Pat. No. 3,476,024 to Deering et al. and entitled APPARATUS FOR ERECTING CARTONS. In FIGS. 18 and 19 Jones shows transport lugs 12 for capturing and carrying cartons 230 along the conveyor 11 of the cartoning machine. Deering et al. show the use of transport lugs 51, 53 to erect and carry cartons 22 along a conveyor chain 48.

Although neither of the above-mentioned patents disclose the specific fastening method of attaching the transport lugs to the conveyor chain of the cartoning machine, typically conventional fastening means such as pins, rivets, bolts, etc. have been used to make the attachment between each transport lug and its associated conveyor chain. For example, the lugs are frequently pinned to the chains via extended chain link pins. When it is desired to change over the cartoning machine to a different size carton, the transport lugs are moved toward or away from each other via relative motion of the independent carrying chains to accommodate smaller or larger cartons. Such adjustment, however, is limited by the original lug spacing and it is frequently necessary to detach the lugs from the chains and to remount them. Thus, one problem associated with such transport lugs has been the necessarily long changeover time required when initially setting the cartoning machine up for a specifically sized carton or during changeover from one size carton to another.

More specifically, during such set up and/or changeover, it is necessary to remove the transport lugs and change their relative positions along the length of the respective conveyor chains to create pockets between adjacent lugs which accommodate cartons of a specific size. In other words, the pocket between adjacent transport lugs which receives an erected carton blank must be sized during setup of the machine to snugly receive a carton blank by adjusting the spacing between adjacent lugs forming the pocket.

The setup operation during which transport lugs are attached to the conveyor chain to form uniformly sized and spaced pockets has typically been a very time consuming process since each transport lug must be attached to the conveyor chain with a typical fastener such as a pin, rivet or bolt. This setup time involves significant labor costs and machine down time thereby increasing the overall cost associated with using such a cartoning machine.

Accordingly, it has been an object of the present invention to provide improved transport lugs which can easily and quickly be changed or reset to reduce the labor cost and machine down time associated with carton size setup and changeover of cartoning machines.

SUMMARY OF THE INVENTION

To these ends, a preferred embodiment of the present invention contemplates a quick-disconnect transport lug for a conventional cartoning machine and which includes a spring biased selectively operable locking mechanism which provides a means for quickly attaching and removing the transport lug from pins extending from the conveyor chain of the cartoning machine. The transport lug preferably includes two upstanding fingers which provide surfaces defining one end boundary of the pocket receiving the carton blank. An integral base member at the lower end of the fingers includes attachment means for connecting the transport lug to studs or pins which extend from the conveyor chain in a direction perpendicular to the path of the conveyor.

Preferably, the base member includes an outer cavity which contains a pivoted spring biased latch including a spring member, a lever end operable by the user and a hooked portion which engages one of the studs extending from the conveyor chain. Two such studs extend from the conveyor chain. Each is received in a respective slot or recess extending upwardly from the lower edge of the base member. One of the slots has an angled portion and includes an inner or stud holding portion extending parallel to the path of the conveyor. A stud may be slidingly received in this slot and situated in the innermost portion of the slot extending parallel to the path of the conveyor. The other recess extends upwardly into the base member in a direction generally perpendicular to the path of the conveyor. A stud resident in this slot is then firmly but releasably engaged by the hooked portion of the spring member.

The spring member comprises a resilient extension of the latch which bears against an inner wall of the cavity of the base member to keep the hooked portion of the latch in a normally closed position for engagement with a stud. The lever portion of the spring member may be depressed by the user against the biasing force of the resilient extension to engage and disengage the hooked portion of the spring member from a stud received in the slot over which the hooked portion of the spring member normally extends. The lever is released by the user to allow the resilient extension to bias the hooked portion of the spring member into its normally closed position, capturing a stud and holding the lug on the associated chain. Accordingly, all that is necessary to change lug positions along the chain is to manipulate the lever and unhook the latch. The lug is then tilted to clear the unhooked stud and moved slightly rearwardly to clear the other stud. The lug is then lifted easily off the chain by hand, with no tools required in the process. The lug is then reset on the chain by sliding it onto a desired pin, then tilting it forwardly so the latch captures a second pin, all without tools and easily accomplished in a short motion.

Further objects and advantages will become readily apparent to those of ordinary skill in the art from the following detailed description taken in conjunction with the accompanying drawings.

BRIEF DESCRIPTION OF THE DRAWINGS

FIG. 1 is an elevated side view of the quick-disconnect lug of the present invention;

FIG. 2 is an elevated side view showing the manner of attaching the quick-disconnect lug to the conveyor chain of a carton machine;

DETAILED DESCRIPTION OF THE PREFERRED EMBODIMENT

Figure 3:
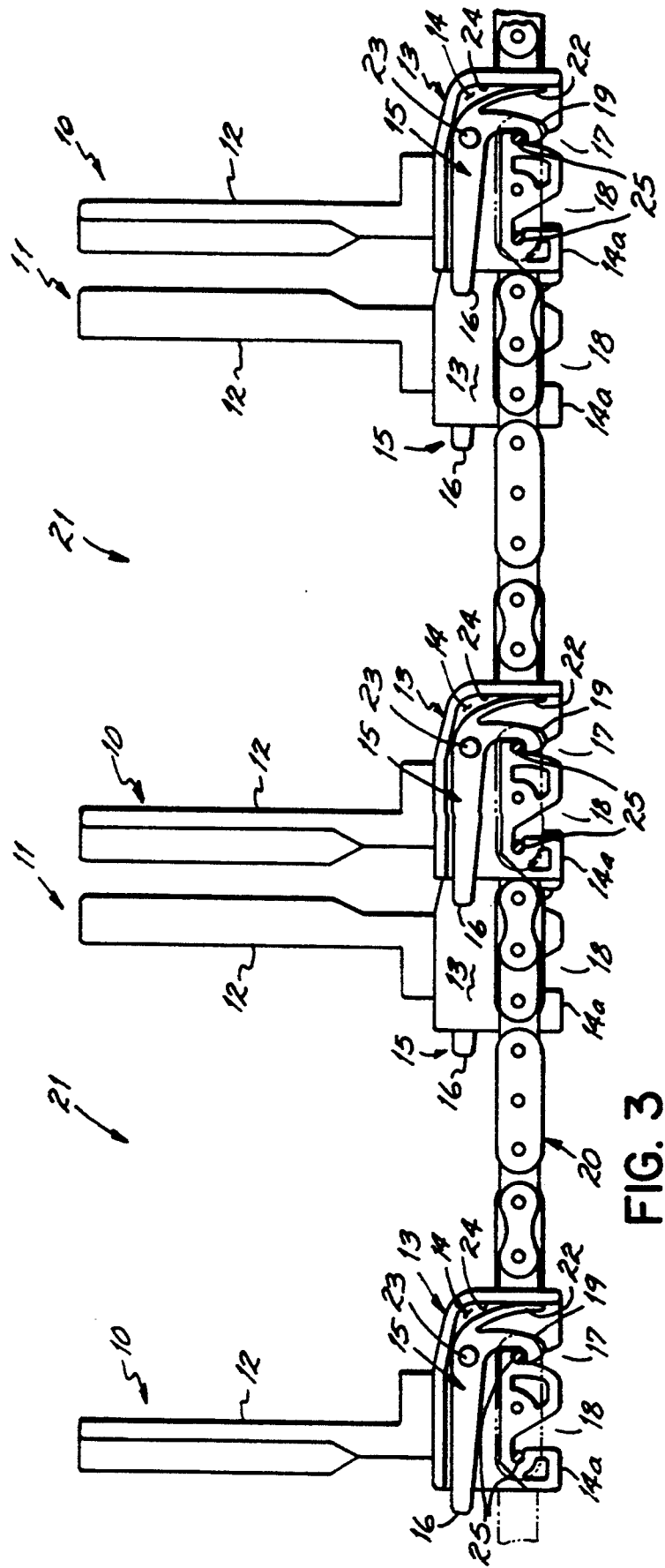
FIG. 3 is an elevational view of a plurality of quick-disconnect lugs attached to the conveyor chains of a carton machine, with only one chain shown.

It will be appreciated that the quick disconnect apparatus of the present invention can be used to connect various attachments, such as buckets or other devices to a chain. Nevertheless, a preferred embodiment of the invention finds useful application in attaching carton lugs to the conveyor chains in a cartoning apparatus.

Referring first to FIG. 1, a quick-disconnect lug 10 includes two upstanding fingers 12 (with only one being visible in side view) and a base 13 attached at the lower end of the fingers 12. The fingers 12 and base 13 are preferably molded integrally from a polymeric material.

The base 13 carries the means for attaching the quick-disconnect lug to the conveyor chain 20 of a cartoning machine. In the preferred embodiment of the invention, the base 13 includes a cavity 14 facing away from the conveyor chain 20 upon attachment thereto. The cavity 14 contains a integrally formed pivoted latch that includes a lever 16, a hooked portion 19 and a resilient extension portion or spring 22. The latch 15 is preferably formed in one piece from a polymeric material such as Delrin ®, and is pivotally connected to the base 13 by a suitable fastener pin 23 located at the junction of the lever 16 and the respective hook 19.

The base 13 further includes two slots or recesses 17, 18 extending upwardly from the lower edge 14a of the base member cavity 14. The two recesses 17, 18 are spaced to receive two respective studs 25 extending perpendicularly from the axis of the conveyor chain 20 (FIG. 2). Recess 18 is angled and has an innermost stud-receiving portion 18a that extends parallel to the axis of the conveyor chain 20 upon attachment thereto. Recess 17 extends upwardly into the base 13 in a direction generally perpendicular to the axis of the conveyor chain 20 upon attachment thereto. The hooked portion 19 of the latch 15 is normally biased into a position in which it is adapted to firmly engage a stud 25 and hold it against the inner end at the top of the recess 17. Hooked portion 19 is normally biased closed by the force of the resilient extension 22 acting against an inner side wall 24 of the base member cavity 14.

Figure 4:
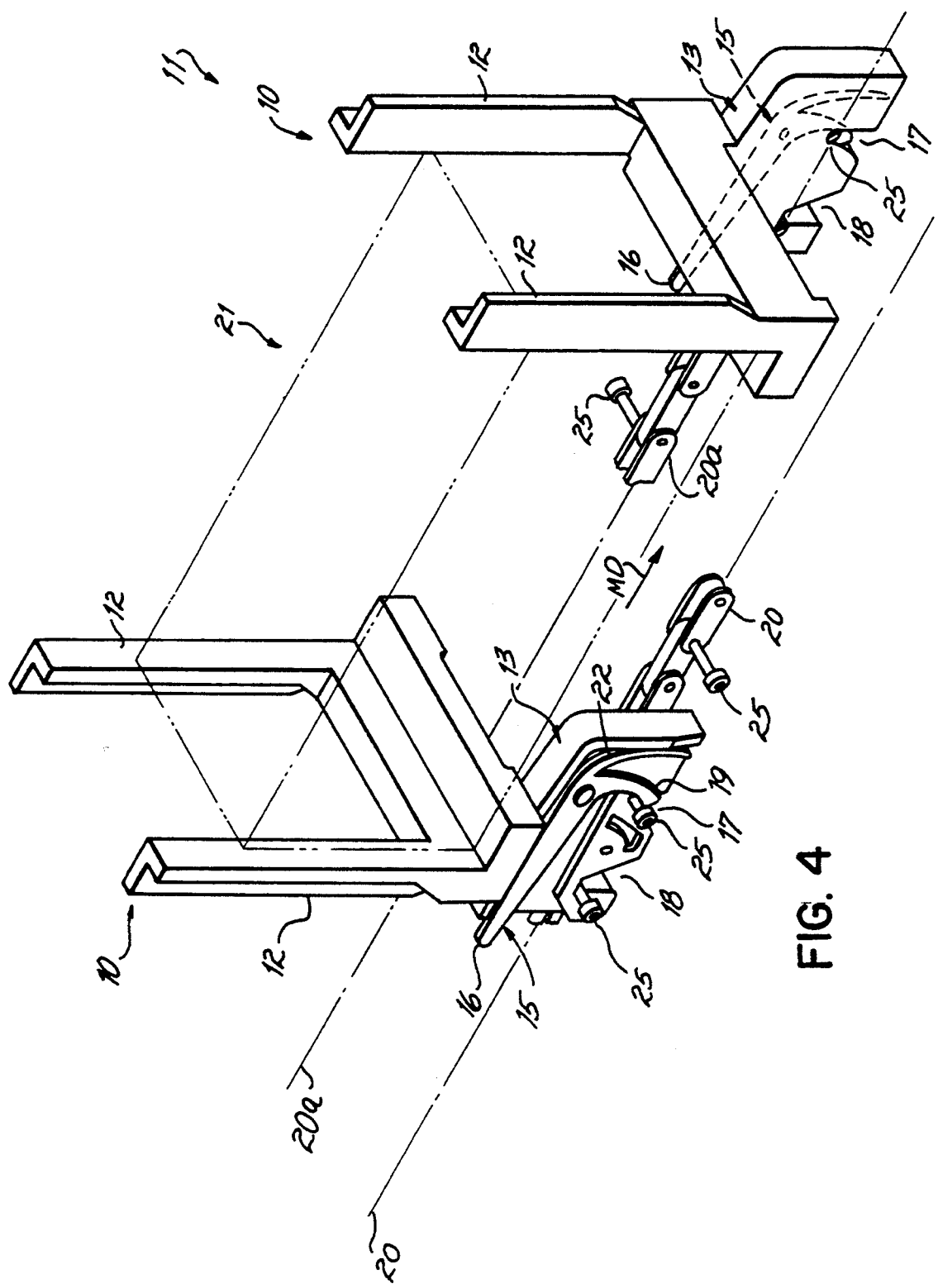
FIG. 4 is a perspective view illustrating two lugs according to the invention mounted on respective carton chains.

Referring now to FIG. 3, a first set of quick-disconnect lugs 10 are shown connected to a conveyor chain 20 and a second set of quick disconnect lugs 11 are shown and are connected to a second conveyor chain 20a (not shown-see FIG. 4). A pocket 21 is thus created between a lug 10 from the first set and an adjacent lug 11 from the second set. The pockets are adapted to receive cartons to be erected, filled and sealed by the cartoning machine.

The attachment bases of the lugs 10 are oriented in a "left-handed" manner and the attachment bases of the lugs 11 are oriented in a "right-handed" manner. Thus, one left-handed lug 10 and one right-handed lug 11 form the pocket 21 which receives a carton to be erected, filled and sealed by the cartoning machine. More particularly, it will be appreciated that the bases 13 of the lugs 11 are disposed on the other side of the lug than the bases 13 of lug 10, but that the orientation of the bases for each lug 10, 11 is as shown in FIGS. 1-3 with respect to the direction of extension of chains 20, 20a.

The quick-disconnect lugs 10, 11 are attached to studs extending outwardly and perpendicularly from the respective conveyor chains 20, 20a such that the base members of the lugs 10 and 11 are positioned on opposite sides of the carton machine conveyor. It will be appreciated that the lugs 10, 11 are easily adjustably positionable along the length of the conveyor chains to accommodate cartons of different sizes. To this end, studs 25 may be provided at numerous locations along the length of each conveyor chain to allow a wide array of lug configurations. As an example, the studs may comprise the chain pins attaching each chain link to another, these thus being one stud for each chain link or pitch. In this regard, it will be appreciated that the portion 18a of slot 18 is spaced from the inner end of the top of slot 17 a distance equal to the length of a chain link so that lugs 10, 11 can be placed as desired along the chains in any position which is a multiple of a chain link.

The attachment and removal of a quick-disconnect lug 10 will now be described with reference to FIG. 2. The procedures for attaching and removing the left-handed lug 10 are shown in FIG. 2 and will be described in detail with the understanding that the procedures for the right-handed lugs 11 are essentially identical.

As shown in FIG. 2, the base 13 of the lug 10 is attached by angling the base member as shown and sliding the angled recess or slot 18 over a stud 25 extending from the conveyor chain 20. The lug is moved slightly forwardly so the stud 25 in slot 18 is captured in slot portion 18a. At the same time, the lever 16 of the latch 15 is depressed by the operator from its initial position (shown in phantom) or by engagement of the tapered surface 19a of the hook 19 on stud 25 as the lug is rotated, to a position which causes the latch 15 to pivot about the fastener 23. This pivoting action causes the hook member 19 to move away from the recess or slot 17 against the biasing force of the resilient extension or spring member 22. While the hook portion 19 is in this position, the base 13 continues pivoting downwardly about the stud 25 contained in recess 18, so that the recess 17 is pressed over a second stud 25. Once the surface 19a passes the lug, the lever 16 of the latch 15 is biased by the resilient extension 22 to move the hook portion 19 into its normally closed position in firm engagement with and holding the stud 25 contained in the recess 17, until an operator depresses lever 16 to remove the lug.

The quick-disconnect lug 10 is removed by reversing the attachment procedure described above. That is, the lever 16 is first depressed by the operator to disengage the hook portion 19 from the stud 25 contained in the slot or recess 17. The lug 10 is then pivoted about the stud 25 contained in the recess 18a so slot 17 clears its stud 25. The base member 13 is then shifted slightly rearwardly to clear stud 25 from slot 18a and is lifted off the stud 25.

It will be appreciated that other latch or spring configurations may be substituted for the latch and base shown in the preferred embodiment described above. For example, compression or tension spring arrangements may be easily substituted for the resilient extension member. Also, a push button or other member may be substituted for the lever portion of the latch.

Accordingly, the present invention provides for faster and easier setup and/or changeover of the lugs of a cartoning machine. Thus, costs associated with cartoning machines utilizing the lugs are reduced through saved labor time and minimized machine downtime during such setup and changeover procedures.

Turning now to FIG. 4, there is shown one lug 10 attached to a chain 20 and a lug 11 attached to a chain 20a, creating a carton receiving pocket 21. The chains move in unison during a cartoning operation, and may be moved relative to one another to slightly adjust the length of pocket 21 along the conveyor. Nevertheless, this adjustment may not accommodate the carton size change necessary. For example, movement of the chains 20, 20a in opposite respective directions will move the lugs shown relative to each other and also move then toward other lugs in the opposite set. If too much movement, the lug 10, for example, will back into another lug 11. See the middle lugs 10, 11 in FIG. 3 for example. One might halt the other if the size of pockets 21 were increased very much. Thus, the adjustments by chain movement is limited by the spacing of the lugs. Where greater adjustment is required, the lugs are easily detached, by means of the invention, for resetting.

Although a preferred embodiment of the present invention has been shown and described in detail, these and other modifications and advantages will be readily apparent to those of ordinary skill in the art without departing from the scope of the invention and applicant intends only to be bound by the claims appended hereto.

What is claimed is:

1. A quick-disconnect lug for positioning cartons on a chain conveyor of a cartoning machine, said lug comprising:
   a base means for attaching said lug to said chain conveyor on said cartoning machine;
   recess means in said base for receiving studs extending from said chain conveyor means;
   spring-biased latch means attached to said base means for locking at least one of said studs in a recess means;
   said latch means being independent from said recess means and,
   canon engaging lug members extending from said base means for carrying said cartons through said cartoning machine.

2. The quick-disconnect lug of claim 1 wherein said spring-biased latch means comprises a lever attached to said base means and having hook means normally biased in a locked position for capturing a stud, extending from said chain conveyor, in a recess means.

3. The quick-disconnect lug of claim 2 wherein said latch means is pivoted to said base between said lever and said hook means.

4. The quick-disconnect lug of claim 3 including a spring finger integrally formed with said lever from a polymeric material.

5. The quick-disconnect lug of claim 2 wherein said hook means is disposed over a recess means and is pivotable away from said recess means.

6. The quick-disconnect lug of claim 5 wherein said hook means includes an outer tapered surface for engagement by a stud to rotate said hook and lever when said base means is pressed over a stud.

7. The quick-disconnect lug of claim 1 wherein said recess means includes two recesses, one recess having an upper slot portion disposed at an angle to the recess for receiving a stud, and another recess having an inner end spaced from said upper slot portion a distance approximately equal to a distance between two of said studs.

8. In a cartoning machine having at least one moving conveyor chain for conveying cartons through said machine, said chain having a plurality of outwardly extending transverse studs, and the improvement comprising:
   a plurality of quick-disconnect carton engaging lugs spaced along said conveyor;
   each lug having base means for attaching said lug to said conveyor chain on said cartoning machine, said base means including recess means for receiving selected studs extending from said chain;
   spring-biased latch means independent of said recess means and attached to said base means for locking at least one of said studs in one of said recess means; and,
   carton engaging lug means extending from said base means carrying cartons through said machine.

9. The improvement of claim 8 wherein said spring-biased latch means comprises a lever pivoted to said base means and a hook means normally biased in a locked position for capturing a stud extending from said chain in a recess means.

10. The improvement of claim 9 wherein said latch means is pivoted to said base between said lever and said hook means.

11. The quick-disconnect lug of claim 9 wherein said hook means includes a tapered surface for urging said hook in a direction to clear a stud being engaged by said hook means, said hook means being biased to capture said stud after said stud passes said surface when said lug is attached to said chain.

12. The improvement of claim 9 wherein said hook means is disposed over a recess means and is pivotable away therefrom.

13. The improvement of claim 11 wherein said hook means includes an outer tapered surface for engagement by a stud to rotate said hook and lever when said base means is pressed over a stud.

14. A quick-disconnect apparatus for securing devices to chain conveyor having studs extending therefrom, said apparatus comprising:
   a base means for attaching said apparatus to said chain conveyor;
   recess means in said base means for receiving studs extending from said chain conveyor; and
   spring-biased latch means independent of said recess attached to said base means for locking at least one of said studs in a recess means.

* * * * *